United States Patent [19]
Barreau et al.

[11] Patent Number: 5,549,809
[45] Date of Patent: Aug. 27, 1996

[54] METHOD FOR HARDENING METALLIC ELEMENTS

[75] Inventors: Eric L. P. Barreau, Louviers; Yves C. L. A. Honnorat, Gometz la Ville; Robert L. Martinou, Bry sur Marne; Catherine M. H. Richin, Roinville sous Dourdan, all of France

[73] Assignee: Societe Nationale d'Etude et de Construction de Moteurs d'Aviation "Snecma", Paris, France

[21] Appl. No.: 289,253

[22] Filed: Aug. 11, 1994

[30] Foreign Application Priority Data

Aug. 12, 1993 [FR] France .................................. 93 09894

[51] Int. Cl.⁶ .............................. C22F 1/10; C25D 5/48
[52] U.S. Cl. .................... 205/222; 29/527.2; 29/DIG. 36; 72/53; 205/208
[58] Field of Search .................... 205/222, 208; 72/53; 29/DIG. 36, 90.7, 527.2

[56] References Cited

U.S. PATENT DOCUMENTS

| | | | |
|---|---|---|---|
| 3,787,191 | 1/1974 | Duncan | 29/191 |
| 4,426,411 | 1/1984 | Sasaki et al. | 427/349 |
| 4,581,913 | 4/1986 | Reed | 72/53 |
| 4,773,244 | 9/1988 | Honda et al. | 72/46 |
| 4,914,796 | 4/1990 | Lioy et al. | 29/121.8 |
| 5,074,970 | 12/1991 | Routsis et al. | 205/122 |
| 5,205,145 | 4/1993 | Ishino et al. | 72/53 |
| 5,240,520 | 8/1993 | Tarui et al. | 148/532 |

FOREIGN PATENT DOCUMENTS

| | | |
|---|---|---|
| 0360192 | 3/1990 | European Pat. Off. |
| 2212172 | 7/1989 | United Kingdom . |

OTHER PUBLICATIONS

Patent Abstracts of Japan, vol. 6, No. 171 (P–140), JP 57 088449, Jun. 2, 1982.

*Primary Examiner*—John Niebling
*Assistant Examiner*—William T. Leader
*Attorney, Agent, or Firm*—Oblon, Spivak, McClelland, Maier & Neustadt, P.C.

[57] ABSTRACT

The invention is directed to a method for hardening a metallic part by shot blasting. In prior art hardening processes, debris from the projectiles is frequently encrusted on the surface of the part and forms indents whose bottom is often sharp and which may constitute a starting point for rupture caused by metal fatigue. The inventive process allows hardening without damaging the surface of the part. Prior to shot blasting, a metallic protection film which may, for example, be made of nickel or a nickel-base alloy, is electrolytically deposited on the part. The protection film is thick enough to adhere to the metallic part throughout the shot blasting step but thin enough to allow the shot blasting to work harden the part and to impart a residual compressive stress thereto. After the shot blasting is completed, the protection film is removed.

5 Claims, 1 Drawing Sheet

X200

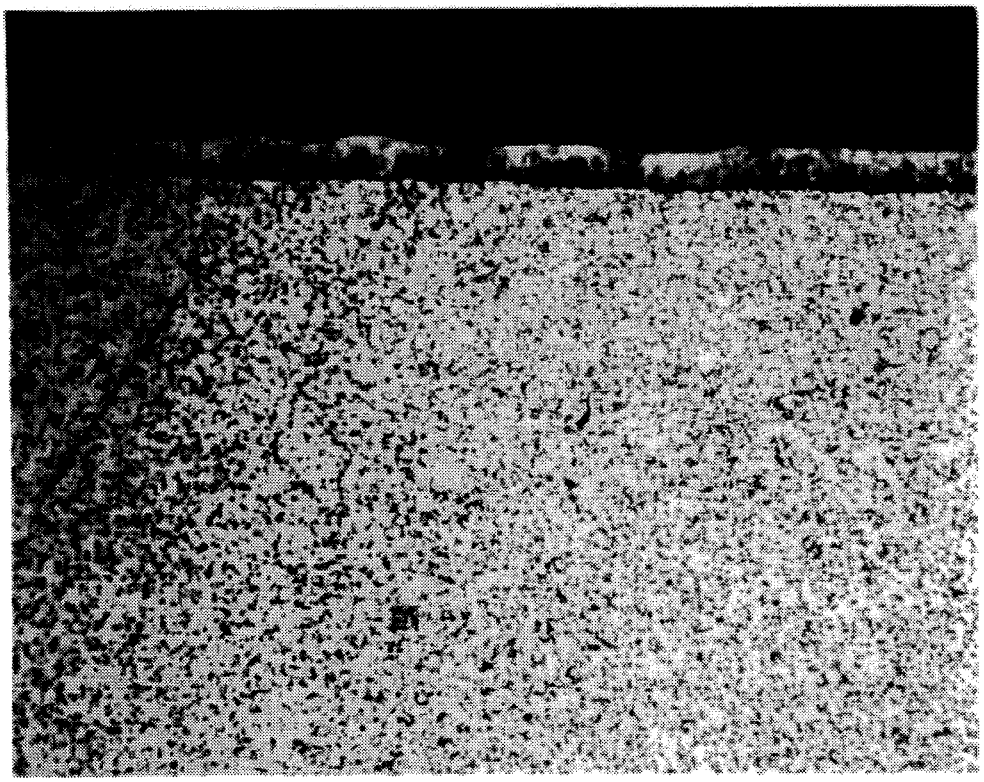

METHOD FOR HARDENING METALLIC ELEMENTS

FIELD OF THE INVENTION

The invention concerns a method for hardening metallic elements.

BACKGROUND OF THE INVENTION

A number of techniques exist to increase the surface hardness of metallic elements; a metal film can be placed on the elements which is harder than the metal constituting it, such as an element in the form of plasma, or work-harden the surface of the element by means of shot blasting which introduces superficial compression stresses. In the case of shot blasting, debris of projectiles are frequently incrusted on the surface of the element and form there indents whose bottom is often sharp and constitutes a start of rupture caused by metal fatigue of the element which may impair the benefits of the surface hardness obtained.

SUMMARY OF THE INVENTION

The invention concerns an improvement of the prestressing shot blasting method, the aim of the invention being to carry out hardening without damaging the surface of the element. Prior to shot blasting, the means retained consists of an intermediate metallic deposit deposited by electrolytic means of the basic metal. The sole purpose of the coating is to be inserted between the element to be hardened and the shot blasting projectiles and transmit hardening prestressings but not the surface damage. It does not play any role in the mechanical resistance of the element and moreover may be removed after shot blasting. The method of the invention is distinguished from other shot blasting methods in that its intended aim is to harden the coating rather than the substrate element. One main difference is that the coating is then much thicker, namely about several hundreds of micrometers, instead of several tens in the invention, which does not allow the prestressings to penetrate into the substrate.

BRIEF DESCRIPTION OF THE DRAWINGS

The invention shall now be described by way of non-restrictive illustration with the aid of the following figure showing one embodiment of the invention:

the sole FIGURE is a section through a shot-blasted element sample.

DETAILED DESCRIPTION OF THE PREFERRED EMBODIMENTS

Shot blasting tests have been conducted with elements appearing in the form of Astroloy blocks which is a nickel alloy with 17 or 18% of cobalt obtained in the metallurgy of the powders. The coatings deposited on this substrate consisted of nickel with a hardness of between 250 and 280 HV and cobalt-nickel with a hardness of 100 HV. It has been found that excessively thin thicknesses did not result in obtaining satisfactory results as the deposit was then partially pulled up or traversed by the shot blasting projectiles.

The deposit is effected by using a nickel sulfamate bath giving slightly high residual stresses until a sub-film is obtained with a thickness of between 0.020 and 0.1 mm. Normal precautions are taken in similar cases: this is why the blocks need to be firstly degreased, pickled and activated.

It has been observed that thicknesses of between 12 and 25 micrometers of nickel or nickel alloy were sufficient to ensure cohesion of the deposit without the loss of adherence to the basic metal of the element. FIG. 1 shows the aspect obtained following an ordinary shot-blasting: the traces of the projectiles are clearly visible on the deposit but no deterioration exists on the surface of the basic metal, which is, however, subject to residual compression stresses as desired. The stressed zone is slightly less deep than for a shot-blasting carried out without any nickel deposit (140 micrometers instead of about 180) but the stressing obtained is also high, indeed more (1250 MPa instead of about 1100).

It is then possible to remove the coating, for example by means of chemical attack, with for example, nitric acid, for a nickel or nickel alloy coating or according to alloys by means of a known dissolution method.

However, it is possible to use more severe prestressing shot-blasting conditions resulting in obtaining a notched depth of at least 200 microns. In this case, the thickness of the coating could be slightly larger than the one which is compatible with an orndnary shot-blasting. The thickness limit depends on two requirements: conservation of adherence of the film deposited at the time of impact of the projectiles and placing under a high residual compression stressing of the substrate. Advantageously, the thickness of the protection film is between 0.012 and 0.025 mm.

It has been observed that the adherence of the deposit to the metal or alloy constituting the substrate of the element was required so as to ensure a good quality of the processing subsequent to shot-blasting and which was not always ensured in practice. This is why the deposit by electrolytic means allowing for a more intimate linking of the deposit to the substrate is envisaged for this invention. In addition, the electrolytic coating makes it possible to avoid any incrustation of material in the substrate which would prejudice the period of life of the elements. Again, it is felt that it is often preferable to select as a basic coating metal the basic metal of the alloy constituting the substrate or the sole metal of the substrate so as to help linking to the substrate. This explains that first of all nickel-plated coatings have been examined so as to use them for the elements of turbomachines of aircraft engines built of nickel-based super-alloys. These elements are often produced by pressing and sintering the powdered alloy and poured into moulding cases.

What is claimed is:

1. A method for hardening a metallic part, comprising the steps of:

electrolytically depositing a metallic protection film on said metallic part; followed by shot-blasting said metallic part, thereby hardening said metallic part, wherein said metallic protection film is thick enough to adhere to said metallic part throughout said shot-blasting, and said metallic protection film is thin enough to allow said shot blasting to work harden said metallic part and to impart a residual compressive stress thereto, and removing said metallic protection film after completion of said shot-blasting.

2. The method of claim 1, wherein said metallic part is obtained by pressing and sintering a powder.

3. The method of claim 1, wherein said metallic protection film is composed of the basic metal of said metallic part.

4. The method of claim 1, wherein said metallic protection film is made of nickel or a nickel and cobalt alloy, and said metallic part is made of a nickel-based alloy.

5. The method of claim 1, wherein said metallic protection film has a thickness of from 0.012 to 0.025 mm.

* * * * *